Patented May 2, 1933                                                   1,906,666

UNITED STATES PATENT OFFICE

JOHN TORIGIAN, OF WOODSIDE, NEW YORK, ASSIGNOR TO THE DRUG PRODUCTS CO., INC., OF LONG ISLAND CITY, NEW YORK, A CORPORATION OF NEW YORK

PROCESS FOR MAKING BISMUTH SODIUM GLUCONATE AND COLLOIDAL SOLUTION PRODUCED THEREBY

No drawing. Application filed November 26, 1930. Serial No. 498,511.

The present invention relates to improvements in the manufacture and composition of bismuth sodium gluconate colloidal especially intended for the treatment of syphilis.

I have discovered by experimenting with several organic acids to obtain a soluble bismuth salt that gluconic acid is one of the best suitable acids to make a soluble alkaline bismuth salt.

The following example for the preparation of bismuth sodium gluconate is given in detail:

I begin this preparation, using bismuth subnitrate for making bismuth hydroxide. I take bismuth subnitrate 4.41 gms., which is equal to 3 gms. of metallic bismuth and dissolve this with acid nitric 6 gms. Then I add aqua double distilled quantity sufficient to make 368 cc. I then add to this solution sodium hydroxide 50% solution freshly prepared 6.75 cc. adding drop by drop and stirring the solution. Here I make a bismuth hydroxide finely powdered and insoluble in water.

The next step is to filter this through wet filter paper and wash the precipitate several times until free from nitrate or nitric acid. The filtrate does not contain any soluble bismuth salt. This can be detected by adding a few drops of sodium hydroxide to the filtrate, which should not produce a cloudiness or white precipitate.

I then put in a beaker 50 cc. of aqua double distilled and to this add 6.56 gms. of acid gluconic pure anhydrous. I then dissolve said acid gluconic pure anhydrous by the aid of gentle heat.

Then I add sodium hydroxide 50% solution 5 cc. To this mixture I add the precipitated bismuth hydroxide of the filter paper and heat gently until completely dissolved. Then I bring the solution to a boil for about two minutes. Then I remove the solution from the burner and let it cool to the room temperature.

Then I adjust the hydrogen ion concentration pH value of substantially 8.5 adding sodium hydroxide solution, if necessary. After adjusting the pH I add 2% benzyl alcohol as a local anesthetic. I then add aqua double distilled quantity sufficient to make 368 cc. Each 1 cc. of this solution contains 0.008 gms. of metallic bismuth.

It is not necessary to add dextrose sucrose or any other sugar protective colloid to make the solution colloidal or to avoid precipitation. I let it stand for not less than 24 hours to settle all impurities, if there are any, and then filter through washed filter paper into a clean and dry glass container and then fill into 1 cc. dry and sterile ampuls. I then seal and sterilize not over 100° C. in boiling water. Autoclaving this ampul will cause hydrolysis and separation of bismuth hydroxide. A sample examined in ultra-microscope shows very fine colloid particles with a Brownian movement. A chemical test shows 0.008 gm. metallic bismuth.

$NaBiO_2 + 2\frac{1}{2}NaC_6H_{11}O_7$, Mole weight = 808

Theoretically, the proportions of the ingredients are as follows:

|  | Per cent |
|---|---|
| Sodium | 10 |
| Bismuth | 25.8 |
| Gluconic acid | 60 |

The proportions of the ingredients as found by analysis are as follows:

|  | Per cent |
|---|---|
| Sodium | 11 |
| Bismuth | 25.2 |
| Gluconic acid | 57 |

Although the bismuth sodium gluconate is not a single compound, it is proper to continue the use of the name. If bismuth sodium gluconate were a single compound it would not be in true colloidal state.

To find out the minimum lethal dose of this preparation a physiological test was carried on by injecting my preparation to albino rats. After extensive experimenting, I found that the minimum lethal dose of this solution calculating 1 cc. per 160 lbs. human body weight is 150 times to each gm. body weight which is very satisfactory.

This solution should not be used intravenously or subcutaneously but should be used only intramuscularly to the gluteal region. The colloidal solution of bismuth sodium gluconate is a true colloidal solution and does not require the use of a protective colloid either to maintain the said state of aggregation or to create the same. In its method of preparation, no ingredient is added to keep the compound stable.

I claim:

1. A process of preparing an aqueous colloidal solution of bismuth sodium gluconate, which consists in treating bismuth subnitrate with calculated amounts of nitric acid and sodium hydroxide to produce a bismuth hydroxide and then adding sufficient gluconic acid and sodium hydroxide to give thereto a pH value of substantially 8.5, resulting in the formation of the aqueous colloidal bismuth sodium gluconate.

2. A process of preparing an aqueous colloidal solution of bismuth sodium gluconate, which consists in treating bismuth subnitrate with calculated amounts of nitric acid and sodium hydroxide, filtering and washing the precipitate, and then adding the said precipitate to a solution of a calculated amount of gluconic acid and sodium hydroxide until the precipitate is dissolved and thereafter adding sufficient sodium hydroxide until a pH value of substantially 8.5 is reached.

3. A process of making bismuth sodium gluconate in colloidal solution, which consists in dissolving bismuth subnitrate in calculated amounts of nitric acid, adding distilled water and sodium hydroxide, filtering and washing the precipitate, dissolving gluconic acid and sodium hydroxide in water and adding the precipitate thereto.

4. A therapeutic product comprising an aqueous bismuth sodium gluconate in true colloidal solution.

Signed at New York city in the county of New York and State of New York this 21 day of November, 1930, A. D.

JOHN TORIGIAN.